United States Patent
McGill et al.

(10) Patent No.: US 12,240,501 B2
(45) Date of Patent: Mar. 4, 2025

(54) CONVOLUTION OPERATOR SELECTION

(71) Applicant: TOYOTA RESEARCH INSTITUTE, INC., Los Altos, CA (US)

(72) Inventors: Stephen G. McGill, Broomall, PA (US); Paul Drews, Watertown, MA (US); Guy Rosman, Newton, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 594 days.

(21) Appl. No.: 16/910,395

(22) Filed: Jun. 24, 2020

(65) Prior Publication Data
US 2021/0403056 A1    Dec. 30, 2021

(51) Int. Cl.
*B60W 60/00* (2020.01)
*G06N 3/08* (2023.01)

(52) U.S. Cl.
CPC ............ *B60W 60/00272* (2020.02); *B60W 60/00274* (2020.02); *G06N 3/08* (2013.01); *B60W 2552/10* (2020.02); *B60W 2554/4046* (2020.02); *B60W 2554/4049* (2020.02)

(58) Field of Classification Search
CPC ..... B60W 60/00272; B60W 60/00274; B60W 2554/4046; B60W 2554/4049; B60W 2552/10; G06N 3/08
USPC ........................................................ 701/23
See application file for complete search history.

(56) References Cited

U.S. PATENT DOCUMENTS

| | | |
|---|---|---|
| 9,472,019 B2 | 10/2016 | Jenkins |
| 9,760,806 B1 | 9/2017 | Ning et al. |
| 2008/0126274 A1* | 5/2008 | Jannarone ............... G06N 3/08 706/12 |
| 2011/0246156 A1 | 10/2011 | Zecha et al. |
| 2018/0012085 A1 | 1/2018 | Blayvas et al. |
| 2018/0284785 A1* | 10/2018 | Berntorp ............... G06N 3/08 |
| 2019/0147335 A1* | 5/2019 | Wang ................. G05D 1/0248 706/20 |
| 2019/0294164 A1* | 9/2019 | Wagenmaker ......... G06N 3/084 |

(Continued)

FOREIGN PATENT DOCUMENTS

EP    3219564 A1    9/2017

OTHER PUBLICATIONS

Ganesh, Prakhar, "Types of Convolution Kernels: Simplified," https://web.archive.org/web/20191019064344/https://towardsdatascience.com/types-of-convolution-kernels-simplified-f040cb307c37#:~: text=Convolution%20is%20using%20a%20'kernel,in%20a%20certain%20desirable%20manner (Year: 2019).*

(Continued)

*Primary Examiner* — Marc Burgess
*Assistant Examiner* — John D Holman
(74) *Attorney, Agent, or Firm* — Dinsmore & Shohl LLP (57) ABSTRACT

A vehicle system includes one or more sensors configured to capture aspects of an environment and a computing device. The computing device is configured to receive information about the environment captured by the one or more sensors, determine one or more structures within the environment based on the received information, select a kernel that is parameterized for predicting a vehicle trajectory based on the one or more structures determined within the environment, and perform a convolution of the selected kernel and an array defining the environment, wherein the convolution predicts a future trajectory of a vehicle within the environment.

17 Claims, 5 Drawing Sheets

(56) References Cited

U.S. PATENT DOCUMENTS

| | | | |
|---|---|---|---|
| 2019/0346844 A1 | 11/2019 | Chen et al. | |
| 2020/0202144 A1* | 6/2020 | Porter | G06N 3/08 |
| 2020/0225321 A1* | 7/2020 | Kruglick | G01S 7/417 |
| 2020/0239029 A1* | 7/2020 | Kim | G08G 1/163 |
| 2021/0101606 A1* | 4/2021 | Zhang | H04W 4/027 |
| 2022/0136853 A1* | 5/2022 | Ferencz | G01C 21/3602 |
| | | | 701/423 |

OTHER PUBLICATIONS

Brain4Cars: Car that knows before you do via sensory-fusion deep learning architecture https://arxiv.org/pdf/1601.00740.pdf Jan. 5, 2016.

How future cars will predict your driving maneuvers before you make them https://www.technologyreview.com/s/545506/how-future-cars-will-predict-your-driving-maneuvers-before-you-make-them/ Jan. 15, 2016.

AI can predict the future location of vehicles https://news.developer.nvidia.com/ai-can-predict-the-future-location-of-vehicles/ Sep. 27, 2018.

Learning to predict other vehicles' trajectones for sale autonomous driving https://medium.com/@hello_isee/learning-to-predict-other-vehicles-trajectories-for-safe-autonomous-driving-cbfb1b8053a4 Jun. 17, 2019.

Multi-Agent Tensor Fusion for Contextual Trajectory Prediction Zhao et al., CVPR 2019 URL: https://arxiv.org/pdf/1904.04776.pdf Jul. 28, 2019.

A dual learning model for vehicle trajectory prediction https://www.researchgate.net/publication/338754579 A_Dual_Learning_Model_for_Vehicle_Trajectory_Prediction Jan. 2020.

* cited by examiner

CONVOLUTION OPERATOR SELECTION

TECHNICAL FIELD

The present specification generally relates to convolution operations, and more specifically, to systems and methods for predicting future events using convolution operators or kernels with appropriate parameters.

BACKGROUND

Autonomous and semi-autonomous vehicles and other robotic system implement machine learning techniques and machine learning systems that receive sensor data and compute a response based on the data to perform autonomous and semi-autonomous operations. Many techniques implement convolutional layers within neural network systems that assist with processing large amounts of data such as image data for purposes such as motion planning, object recognition and detection, and the like. However, current techniques rely on abstract models of the world or environment that do not work well in practice.

Accordingly, there exists a need for predicting future events using a convolution operator (i.e., a kernel) with parameters learned and based upon structure from an environment.

SUMMARY

In embodiments, a vehicle system includes one or more sensors configured to capture aspects of an environment and a computing device. The computing device is configured to receive information about the environment captured by the one or more sensors, determine one or more structures within the environment based on the received information, select a kernel that is parameterized for predicting a vehicle trajectory based on the one or more structures determined within the environment, and perform a convolution of the selected kernel and an array defining the environment, wherein the convolution predicts a future trajectory of a vehicle within the environment.

In some embodiments, a computing device configured to receive information about an environment, determine one or more structures within the environment based on the received information, select a kernel that is parameterized for predicting a vehicle trajectory based on the one or more structures determined within the environment, and perform a convolution of the selected kernel and an array defining the environment, wherein the convolution predicts a future trajectory of a vehicle within the environment.

In some embodiments, a method for predicting future events includes receiving information about an environment, determining one or more structures within the environment based on the received information, selecting a kernel that is parameterized for predicting a vehicle trajectory based on the one or more structures determined within the environment, and performing a convolution of the selected kernel and an array defining the environment, wherein the convolution predicts a future trajectory of a vehicle within the environment.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure provide systems and methods for predicting future events using a convolution operator, also referred to as a "kernel" herein, with appropriate parameters based on the environment. More specifically, the disclosure is directed to determining a kernel that best predicts the actual state (e.g., location of a vehicle within a discretized cell defining an environment such as a location within a lane of traffic) by preforming a convolution of the kernel and an array defining the current environment (e.g., the location of vehicles along a lane of traffic defined by a discretized occupancy grid).

The present disclosure utilizes structure of an environment in learning parameters for a convolution. The structure includes features that may be known about an environment, such as width of lanes, number of lanes, traffic density, environment location (e.g., urban vs. rural), weather conditions, or the like. In such an environment, there are structural rules that apply. For example, a vehicle may only shift to an adjacent lane (i.e., the vehicle cannot skip a lane when making a lane change). Such an instance would be an anomaly and designated as an occurrence outside of the model.

The convolution operator or kernel may be a discrete kernel defined as an array or function that is constructed based on structure from the environment and, in some embodiments, based on learned or known behaviors of vehicle movement for the particular environment. The kernel may be specific for locations, situations, and/or environments. In some embodiments, the kernel may be based on a heat equation, which defines the propagation of features, such as heat or an object over time based on a set of derived parameters implemented in the heat equation.

The convolution of the kernel over the discrete array results in an array comprising a new set of numbers that provides a probability distribution of where vehicles may exist. The location of a vehicle may also be referred to a vehicle trajectory or future vehicle trajectory. That is, the vehicle trajectory defines where the vehicle may be at for a future time interval.

In some embodiments, when determining the appropriate values for the kernel, the probability distribution may be compared with a second snapshot of the environment captured by sensors to determine which values of the kernel should be adjusted to better predict the occupancy and the actual location of vehicles in the next frame (i.e., at a subsequent time interval). Once the values of the kernel are more precisely determined, the convolution may be used to predict further into the future. In other words, the goal of the system is to determine which kernel gives an improved prediction of where vehicles will be in the next frame. The kernel may change in the future based on changes in structure or environment factors that are learned from data.

The system can be used to provide a future occupancy map, inform an Advanced Driver Assistance System (ADAS), or provide anomaly detection. In cases where the prediction does not meet and expected result, the system may determine that a poor prediction was made or an anomalous event is occurring. In some instances, the prediction and related information may be transmitted to a cloud environment for further analysis. The resulting poor prediction may be used to generate an alert to the user that something unexpected is occurring in the environment. This may help inform automated systems to provide assistive maneuvering or bring events to the driver's attention so they may respond with advance notice.

Embodiments that will now be described in detail relate to an architecture, systems, and methods for predicting future events using a convolution operator (i.e., a kernel) with parameters learned from and based upon structure from an environment and expected vehicle behaviors therein. The following will now describe the framework, systems, and methods in more detail with reference to the drawings where like number refer to like structures.

Figure 1:
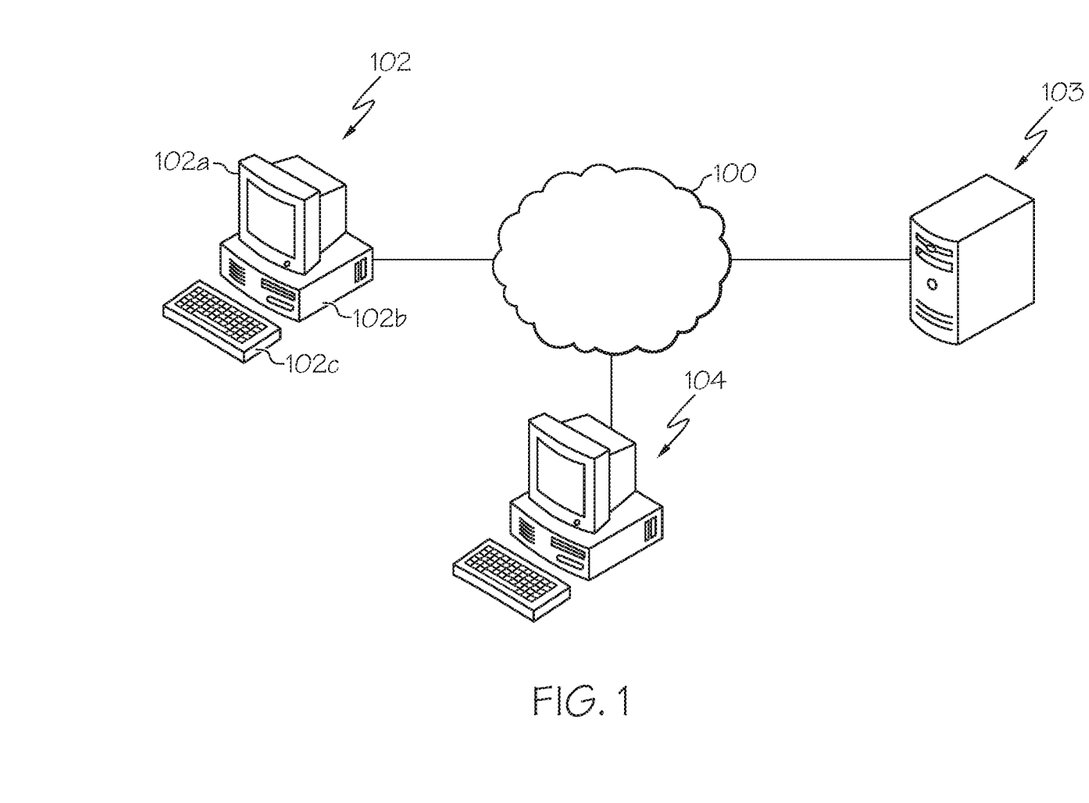
FIG. 1 schematically depicts an example computing network for predicting future events, according to one or more embodiments shown and described herein.

Referring now to the drawings, FIG. 1 depicts an example computing network for predicting future events, such as vehicle trajectories and associated occupancy maps using a convolution operator (i.e., a kernel) with parameters learned from and based upon structure from an environment and expected vehicle behaviors therein, according to one or more embodiments shown and described herein. As illustrated in FIG. 1, a network 100 may include a wide area network, such as the internet, a local area network (LAN), a mobile communications network, a public service telephone network (PSTN) and/or other network and may be configured to electronically connect a user computing device 102, a computing device 103 for performing a simulation, and an administrator computing device 104. As shown and described in the following figures the computing device 103 may be an electronic control unit of a vehicle 210 (See FIG. 2). That is, in some embodiments, the systems and methods described herein may be implemented within a vehicle and some may be implemented remote of the vehicle. Furthermore, in some embodiments, a vehicle 210 may off load or transmit sensor information about an environment to a remotely located computing device 103.

The user computing device 102 may include a display 102a, a processing unit 102b and an input device 102c, each of which may be communicatively coupled to together and/or to the network 100. The user computing device 102 may be used to develop a simulation environment, construct an agent, define behavior primitives, configure a device such as a virtual autonomous vehicle, or the like. The computing device 103 may be implemented with a storage module (e.g., a memory component 240 (FIGS. 2 and 3 and/or a data storage component 236, FIG. 3), an electronic control unit (e.g., a processor 230, FIGS. 2 ad 3) to execute a convolution of a selected kernel and an array defining the environment. Additionally, included in FIG. 1 is the administrator computing device 104. In the event that the computing device 103 requires oversight, updating, or correction before, during, or after executing a convolution, the administrator computing device 104 may be configured to provide the desired oversight, updating, and/or correction interface capabilities.

It should be understood that while the user computing device 102 and the administrator computing device 104 are depicted as personal computers and the computing device 103 is depicted as a server, these are merely examples. More specifically, in some embodiments, any type of computing device (e.g., mobile computing device, personal computer, server, and the like) may be utilized for any of these components. Additionally, while each of these computing devices is illustrated in FIG. 1 as a single piece of hardware, this is also an example. More specifically, each of the user computing device 102, the computing device 103, and administrator computing device 104 may represent a plurality of computers, servers, databases, and the like. Conversely, each of the components may be employed together as a single computing device.

Figure 2:
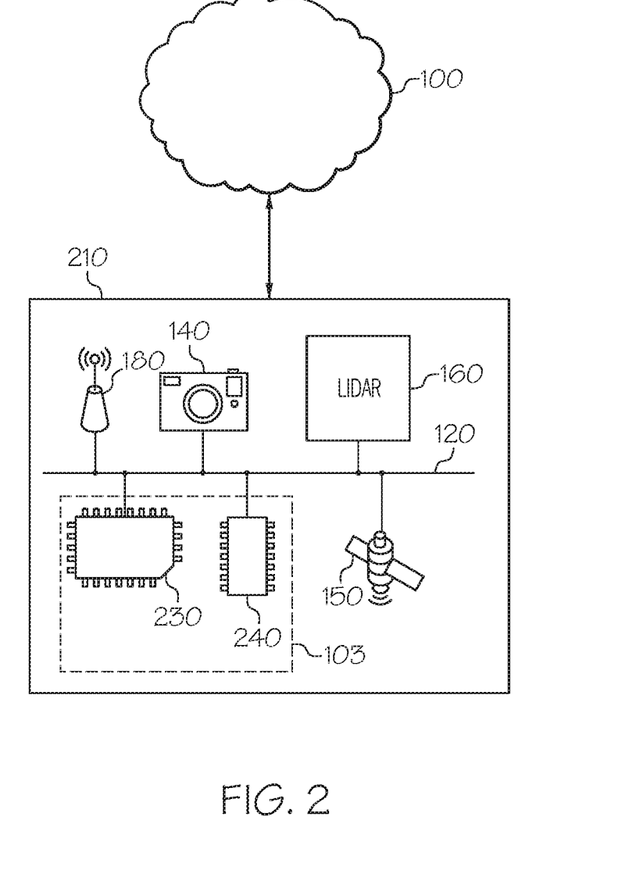
FIG. 2 schematically depicts a vehicle implementing the computing device for predicting future events, according to one or more embodiments shown and described herein.

Referring now to FIG. 2, an illustrative schematic of a vehicle 210 implementing the computing device 103 for predicting future events is depicted. The vehicle 210 may include the computing device 103. The computing device 103 may include a processor 230 and a memory component 240. The vehicle 210 may also include a communication bus 120, one or more cameras 140, a navigation unit 150 (e.g., a global positioning unit, GPS), a LIDAR system 160, and/or network interface hardware 180. As referred to herein, the term "one or more sensors" may include, one or more cameras 140, the navigation unit 150, the LIDAR system 170, and/or a variety of other sensor system capable of ascertaining information about the environment around a vehicle 210 and functionality of the vehicle 210 such as a vehicle speed, a rate of acceleration or deceleration of the vehicle, a vehicle location, a vehicle heading, or the like. The vehicle 210 may be communicatively coupled to a network 100 by way of the network interface hardware 180. The components of the vehicle 210 are communicatively coupled to each other via the communication bus 120.

It is understood that the embodiments depicted and described herein are not limited to the components or configurations depicted and described with respect to FIG. 1, rather FIG. 1 is merely for illustration. The various components of the computing device 103 and the vehicle 210 and the interaction thereof will be described in detail below.

The communication bus 120 may be formed from any medium that is capable of transmitting a signal such as, for example, conductive wires, conductive traces, optical waveguides, or the like. The communication bus 120 may also refer to the expanse in which electromagnetic radiation and their corresponding electromagnetic waves traverses. Moreover, the communication bus 120 may be formed from a combination of mediums capable of transmitting signals. In one embodiment, the communication bus 120 comprises a combination of conductive traces, conductive wires, connectors, and buses that cooperate to permit the transmission of electrical data signals to components such as processors 230, memories, sensors, input devices, output devices, and communication devices. Accordingly, the communication bus 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication bus 120 communicatively couples the various components of the vehicle 210. As used herein, the term "communicatively coupled" means that coupled components are capable of exchanging signals with one another such as, for example, electrical signals via conductive medium, electromagnetic signals via air, optical signals via optical waveguides, and the like.

The computing device 103 may be any device or combination of components comprising a processor 230 and the memory component 240. The processor 230 of the computing device 103 and/or vehicle 210 may be any device capable of executing the machine-readable instruction set stored in the memory component 240. Accordingly, the processor 230 may be an electric controller, an integrated circuit, a microchip, a field programmable gate array, a computer, or any other computing device. The processor 230 is communicatively coupled to the other components of the vehicle 210 by the communication bus 120. Accordingly, the communication bus 120 may communicatively couple any number of processors 230 with one another, and allow the components coupled to the communication bus 120 to operate in a distributed computing environment. Specifically, each of the components may operate as a node that may send and/or receive data. While the embodiment depicted in FIG. 1 includes a single processor 230, other embodiments may include more than one processor 230.

The memory component 240 of the vehicle 210 is coupled to the communication bus 120 and communicatively coupled to the processor 230. The memory component 240 may be a non-transitory computer readable memory and may comprise RAM, ROM, flash memories, hard drives, or any non-transitory memory device capable of storing machine-readable instructions such that the machine-readable instructions can be accessed and executed by the processor 230. The machine-readable instruction set may comprise logic or algorithm(s) written in any programming language of any generation (e.g., 1GL, 2GL, 3GL, 4GL, or 5GL) such as machine language that may be directly executed by the processor 230, or assembly language, object-oriented programming (OOP), scripting languages, microcode, etc., that may be compiled or assembled into machine readable instructions and stored in the memory component 240. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the vehicle 210 depicted in FIG. 1 includes a single memory component 240, other embodiments may include more than one memory component 240.

The vehicle 210 may also include one or more cameras 140. The one or more cameras 140 may be communicatively coupled to the communication bus 120 and to the processor 230. The one or more cameras 140 may be any device having an array of sensing devices (e.g., pixels) capable of detecting radiation in an ultraviolet wavelength band, a visible light wavelength band, or an infrared wavelength band. The one or more cameras 138 may have any resolution. The one or more cameras 140 may be an omnidirectional camera, or a panoramic camera, for example. In some embodiments, one or more optical components, such as a mirror, fish-eye lens, or any other type of lens may be optically coupled to each of the one or more cameras 140. In embodiments described herein, the one or more cameras 140 may capture image data or video data of an environment of a vehicle. That is, with reference to FIG. 2, a vehicle 210 having wheels may include one or more cameras 140 mounted thereon. The one or more cameras 140 may be mounted on a dashboard of a vehicle 210, on a rearview mirror, or elsewhere on the vehicle 210 such that the one or more cameras 140 may capture images of the environment around a vehicle 210. In some embodiments, the vehicle 210 may the computing device 103 configured with a trained neural network. That is, the vehicle 210 may receive information about the environment from the camera 140 to determine one or more structures within the environment for selecting a kernel and performing a convolution of the kernel and the array defining the environment.

The vehicle 210 may also include a, navigation unit 150 that is coupled to the communication bus 120 and communicatively coupled to the processing device 130. The navigation unit 150 may be a global positioning system, GPS that is capable of generating location information indicative of a location of the vehicle 210 by receiving one or more GPS signals from one or more GPS satellites. The GPS signal (e.g., one or more location signals) communicated to the processing device 230 via the communication bus 120 may include location information comprising a National Marine Electronics Association (NMEA) message, a latitude and longitude data set, a street address, a name of a known location based on a location database, or the like. Additionally, the GPS unit may be interchangeable with any other system capable of generating an output indicative of a location. For example, a local positioning system that provides a location based on cellular signals and broadcast towers or a wireless signal detection device capable of triangulating a location by way of wireless signals received from one or more wireless signal antennas.

Still referring to FIG. 2, in some embodiments, the vehicle 210 may include a LIDAR system 160. The LIDAR system 160 is communicatively coupled to the communication bus 120 and the computing device 103. The LIDAR system 160 is used in a light detection and ranging system that uses pulsed laser light to measure distances from the LIDAR system 160 to objects that reflect the pulsed laser light. The LIDAR system 160 may be made of solid-state devices with few or no moving parts, including those configured as optical phased array devices where its prism-like operation permits a wide field-of-view without the weight and size complexities associated with a traditional rotating LIDAR sensor. The LIDAR system 160 is particularly suited to measuring time-of-flight, which in turn can be correlated to distance measurements with objects that are within a field-of-view of the LIDAR system 160. By calculating the difference in return time of the various wavelengths of the pulsed laser light emitted by the LIDAR system 160, a digital 3-D representation of a target or environment may be generated. The pulsed laser light emitted by the LIDAR system 160 may be operated in or near the infrared range of the electromagnetic spectrum, with one example having emitted radiation of about 905 nanometers. Sensors such as LIDAR system 136 can be used by vehicles such as vehicle 210 to provide detailed 3-D spatial information for the identification of one or more features within an environment of the vehicle 210, as well as the use of such information in the service of systems for vehicular mapping, navigation and autonomous operations, especially when used in conjunction with geo-referencing devices such as GPS or a gyroscope-based inertial navigation unit (INU, not shown) or related dead-reckoning system, as well as non-transitory computer readable memory 240 (either its own or memory of the electronic control unit 230).

The vehicle 210 may also include network interface hardware 180 that is communicatively coupled to the computing device 103 via the communication bus 120. The network interface hardware 180 may include any wired or wireless networking hardware, such as a modem, LAN port, Wi-Fi card, WiMax card, mobile communications hardware, and/or other hardware for communicating with a network and/or other devices and systems. For example, the vehicle 210 may be communicatively coupled to a network 100 by way of the network interface hardware 180.

Figure 3:
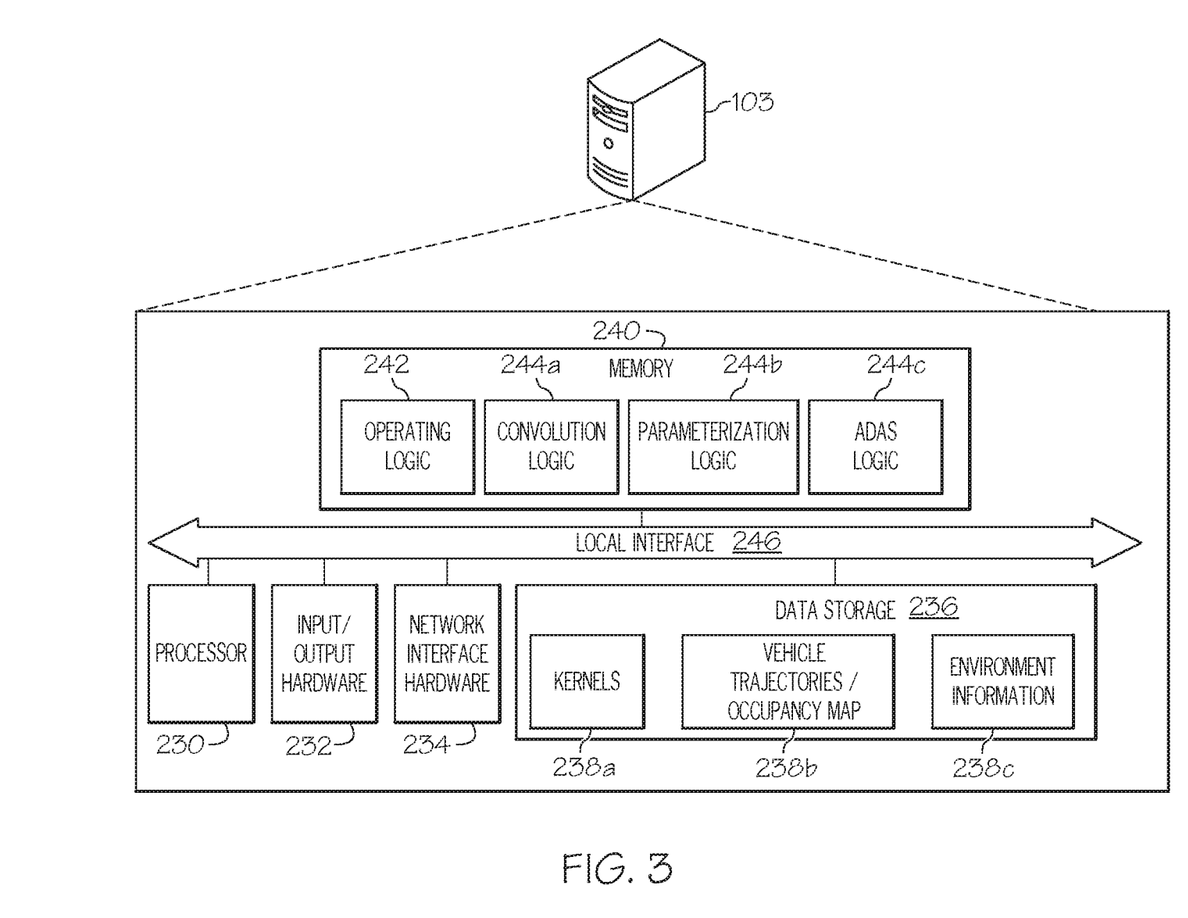
FIG. 3 schematically depicts an example computing device for predicting future events, according to one or more embodiments shown and described herein.

FIG. 3 depicts an example computing device 103 for predicting future events such as future vehicle trajectories and associated occupancy maps using kernels that are specific to the environment that is being analyzed. As depicted and described herein, the computing device 103 may be a component of the vehicle 210 and/or a standalone device. The computing device 103 may utilize hardware, software, and/or firmware, according to embodiments shown and described herein. While in some embodiments, the computing device 103 may be configured as a general-purpose computer with the requisite hardware, software, and/or firmware, in some embodiments, the computing device 103 may be configured as a special purpose computer designed specifically for performing the functionality described herein.

As also illustrated in FIG. 3, the computing device 103 may include a processor 230, input/output hardware 232, network interface hardware 234, a data storage component 236, which stores a library of kernels 238a, sensed and/or predicted vehicle trajectories and/or occupancy maps 238b, environment information 238c, which may be captured by one or more of the environment sensors of the vehicle 210, and a memory component 240. The memory component 240 may be machine-readable memory (which may also be referred to as a non-transitory processor readable memory). The memory component 240 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store operating logic 242, convolution logic 244a, parameterization logic 244b, and ADAS logic 244c (each of which may be embodied as a computer program, firmware, or hardware, as an example). A local interface 246 is also included in FIG. 3 and may be implemented as a bus or other interface to facilitate communication among the components of the computing device 103. In embodiments where the computing device is a component of the vehicle 210, the local interface 246 may be communicatively coupled to the communication bus 120.

The processor 230 may include any processing component(s) configured to receive and execute programming instructions (such as from the data storage component 236 and/or the memory component 240). The instructions may be in the form of a machine-readable instruction set stored in the data storage component 236 and/or the memory component 240. The processor 230 is also referred to herein as an electronic control unit. The input/output hardware 232 may include a monitor, keyboard, mouse, printer, camera, microphone, speaker, and/or other device for receiving, sending, and/or presenting data. The network interface hardware 234 may include any wired or wireless networking hardware, such as a modem, LAN port, Wi-Fi card, WiMax card, mobile communications hardware, and/or other hardware for communicating with other networks (e.g., network 100) and/or devices (e.g., the user computing device 102 and/or the administrator computing device 104).

It should be understood that the data storage component 236 may reside local to and/or remote from the computing device 103 and may be configured to store one or more pieces of data for access by the computing device 103 and/or other components. As illustrated in FIG. 3, the data storage component 236 stores a library of kernels 238a. The library of kernels 238a are a set of kernels that correspond to various environments and vehicle behaviors, such as known vehicle motion constraints and/or rules of a road that may be used to define the kernels such that vehicle behaviors that are not likely to occur or that are impossible within a particular environment are structured within the kernel so that predictions may be more accurately determined for determined types of environments. Moreover, kernels 238a may be defined as an array or function that is constructed based on structure from the environment and learned or known behaviors of vehicle movement. The kernels 238a comprise parameters that are learned from observed vehicle behaviors within an environment having a set of structures that distinguish the environment from other environments. Kernels and the parameters that define the kernel may be specific for locations, situations, and/or environments.

The data storage component 236 may further store sensed and/or predicted vehicle trajectories and/or occupancy maps 238b. The sensed and/or predicted vehicle trajectories and/or occupancy maps 238b may define locations within an environment a vehicle may be located at a predetermined time interval. The locations may be sensed, that is, known locations based on sensor data or may be predicted based on a convolution of the kernel for the environment and an array defining the present environment, for example, based on sensor data. In some embodiments, the predicted locations may be expressed as a vehicle trajectory that maps to one or more future locations of a vehicle and/or an occupancy map that assigns probabilities to the various discretized portions of the environment, where the probabilities indicate the likelihood that a vehicle or object will occupy that portion of the environment during a future time interval.

The computing device 103 may receive and/or store environment information 238c, for example, in the data storage component 236. In some embodiments, for example, when the system is operating online in a vehicle 210, the environment information 238c may be received directly from the one or more sensors of the vehicle 210. In some instances, the environment information 238c may be generated and transmitted to the computing device 103, where the computing device 103 stores the data until it is analyzed and used to make a prediction (e.g., preform a convolution) or used to determine a set of parameters for a kernel 238a.

Still referring to FIG. 3, included in the memory component 240 are the operating logic 242, the convolution logic 244a, the parameterization logic 244b, and the ADAS logic 244c. The operating logic 242 may include an operating system and/or other software for managing components of the computing device 103. The convolution logic 244a may be logic configured to carry out a convolution of a kernel and an array defining an environment to predict a future occupancy (or trajectory, which may include a series of future occupancy locations) of an object such as a vehicle.

The memory component 240 may also include parameterization logic 244b. Parameterization logic 244b may be logic configured to determine parameters for kernels 238a for specific environments, locations, and/or situations within an environment. Situations may include different traffic conditions, weather conditions, the presence of an accident or construction or the like. That is, situations are not necessarily new environments, but rather different occurrences within an environment. While different environments lead to different vehicle behaviors, so do the perspectives and situations within the environment. The parameterization logic 244b is configured to develop one or more kernels that can be applied to an array that defines an environment and situations within the environment to best predict a vehicle's (e.g., a non-ego vehicles) behavior. By predicting a non-ego vehicle's behavior, an ego vehicle 210, such as the one predicting the movement of the non-ego vehicle, may utilize the predicted trajectories and or occupancy of the non-ego vehicle(s) to better inform an Advanced Driver Assistance System such as an autonomous function of a vehicle 210 or robot. ADAS logic 244c stored in the memory component 240 may be any logic used to implement an autonomous or semi-autonomous system in a vehicle 210 or a robot. Such systems may include automatic navigation functions, automatic braking, collision avoidance systems, or the like.

It should be understood that the components illustrated in FIG. 3 are merely exemplary and are not intended to limit the scope of this disclosure. More specifically, while the components in FIG. 3 are illustrated as residing within the computing device 103, this is merely an example. In some embodiments, one or more of the components may reside external to the computing device 103. Similarly, while FIG. 2 is directed to the computing device 103, other components such as the user computing device 102 and the administrator computing device 104 may include similar hardware, software, and/or firmware.

Figure 4:
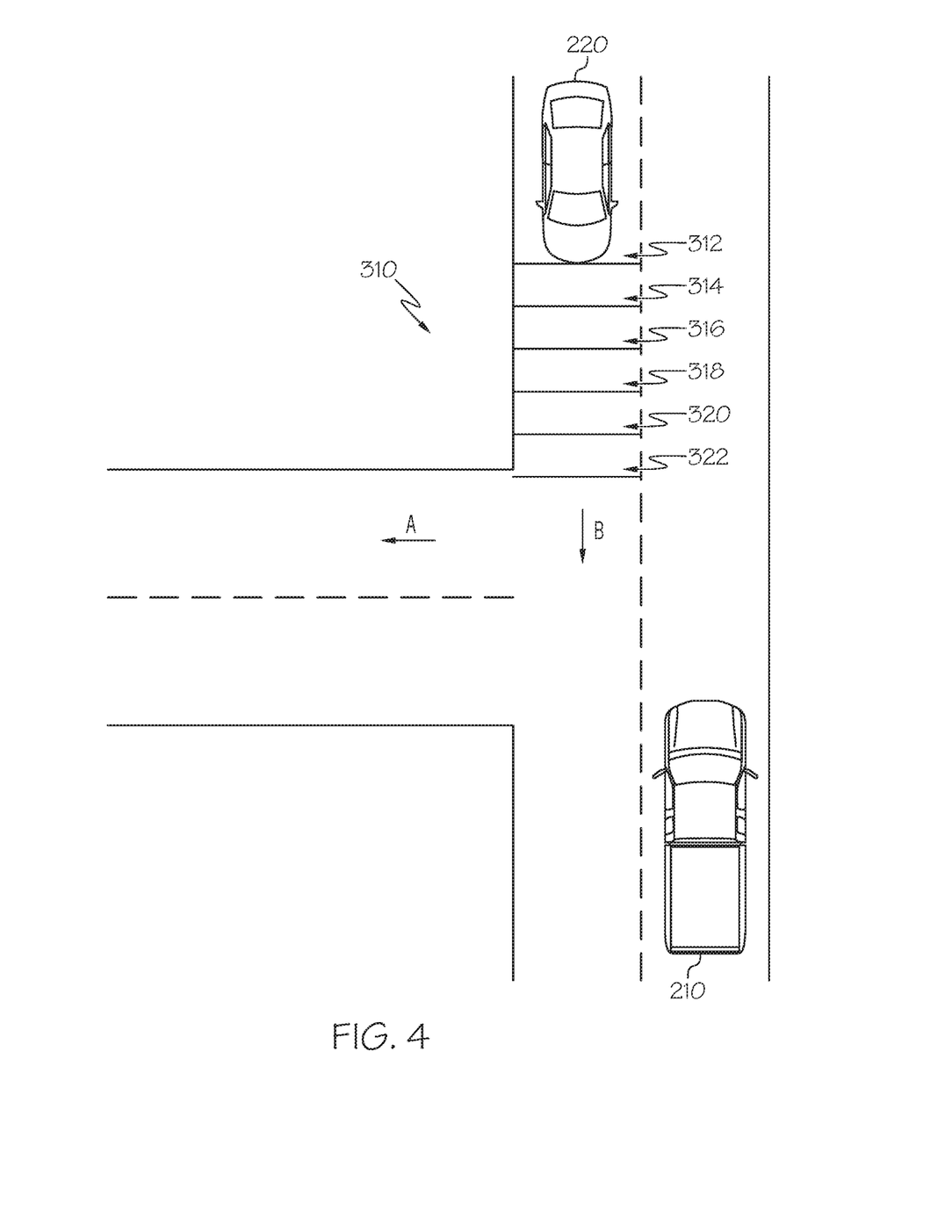
FIG. 4 depicts an illustrative environment having two vehicles, an ego-vehicle and a non-ego vehicle, according to one or more embodiments shown and described herein.

Referring now to FIG. 4, an illustrative environment having two vehicles, an ego-vehicle 210 and a non-ego vehicle 220 is depicted. The environment further depicts several structures in addition to the ego-vehicle 210 and the non-ego vehicle 220. For example, the road scene is structured as a T-intersection. More specifically, the situation depicted is one where the ego vehicle 210 is attempting to maneuver a left turn across on-coming traffic to travel in the direction indicated by arrow A. Accordingly, a kernel specific to a T-intersection and a vehicle seeking a left turn maneuver may be generated and/or selected from a set of pre-parameterized kernels corresponding to the particular environment. Additionally, the present illustrated example is an example where the computing device is implemented in the ego vehicle 210; however, this is not a limitation.

As depicted, the ego vehicle 210 includes one or more sensors configured to capture information about the environment. For example, one or more sensors may include a camera 140 that captures image data of the environment, a navigation unit 150 that identifies the location of the ego vehicle 210, and a LIDAR system 160 that is configured to determine distances from objects within the environment. By determining changes in distances between objects and the ego vehicle 210 speeds of the ego vehicle 210 and/or the objects motion may be determined. Accordingly, an array of the environment may be formed based on the information of the environment obtained from the one or more sensors.

Also depicted in FIG. 4 is a discretization of a portion 310 of the environment. In particular, discretized cells 312, 314, 316, 318, 320, and 322 are depicted. Performing a convolution with the selected kernel corresponding to the environment and/or situation within the environment, a probability distribution may be determined that predicts the occupancy (i.e., the location of the vehicle) within each of the discretized cells 312, 314, 316, 318, 320, and 322 at a future time interval. This defines an occupancy map of future predicted positions of the non-ego vehicle 220. This may also be defined through a determination of a predicted vehicle trajectory, where the trajectory may be identified by the discretized cells having the highest probability of occupancy over one or more time intervals.

It should be understood that although the discretized cells 312, 314, 316, 318, 320, and 322 are depicted in a single column, that an environment may be apportioned into multiple discretized cells in 1-dimension (as depicted), 2-dimensions, or 3-dimensions. By way of non-limiting example, an environment may include a road having two lanes with traffic flowing in opposite directions (e.g., a northbound lane and a southbound lane). A vehicle in the northbound lane of traffic may be attempting to make a left turn across the southbound lane of traffic. In some embodiments, sensors (e.g., on a vehicle or positioned within the environment) capture a snapshot of the occupancy within the southbound lane for a predefined distance. The distance (e.g., 100 meters) captured may be divided into discrete sections (e.g., 1 meter wide "cells"). Assuming a vehicle traveling in the southbound lane is identified at 100 meters away from the northbound vehicle, then the occupancy grid defines 100 intervals (i.e., each of the 1-meter cells) of where the vehicle may be located in the future. The system then performs a convolution between a convolution operator (kernel) and the array defining the occupancy of the southbound lane (i.e., the 100 cells).

Still referring to FIG. 4, for example, the computing device 103 may predict that the non-ego vehicle 220 will have a vehicle trajectory in the direction of arrow B. Furthermore, the computing device 103, by performing a convolution of the kernel corresponding to an environment having a T-intersection and one or more oncoming vehicles with an ego vehicle planning a left turn across on-coming traffic and an array defining the environment, makes a prediction of the vehicle trajectory and a probability relating to likelihood that the non-ego vehicle 220 is within/at each of the discretized cells 312, 314, 316, 318, 320, and 322 may be determined. The convolution may be set to make a prediction of occupancy for a predetermined time in the future. The array defining the environment may include, for example, sensed distance data from one or more sensors of the ego vehicle 210 corresponding to the position of objects at a current (or first) instance in time and/or estimated speeds and directions of object in the environment, widths of lanes of the road, distances to points along a planned left turn, and the like.

In the present example, by predicting the future location of the non-ego vehicle 220 as it approaches the intersection that the ego vehicle 210 is planning a turn through, the predicted trajectory and/or the probability distribution indicating the likelihood of the non-ego vehicle's location at one or more instances of time in the future, an ADAS motion planning system may better plan and execute the left turning maneuver of the ego vehicle 210. It is understood that a computing device 103, in order to perform the convolution, may employ a neural network model that incorporates the kernel and the array defining the environment within one or more layers of the neural network.

Figure 5:
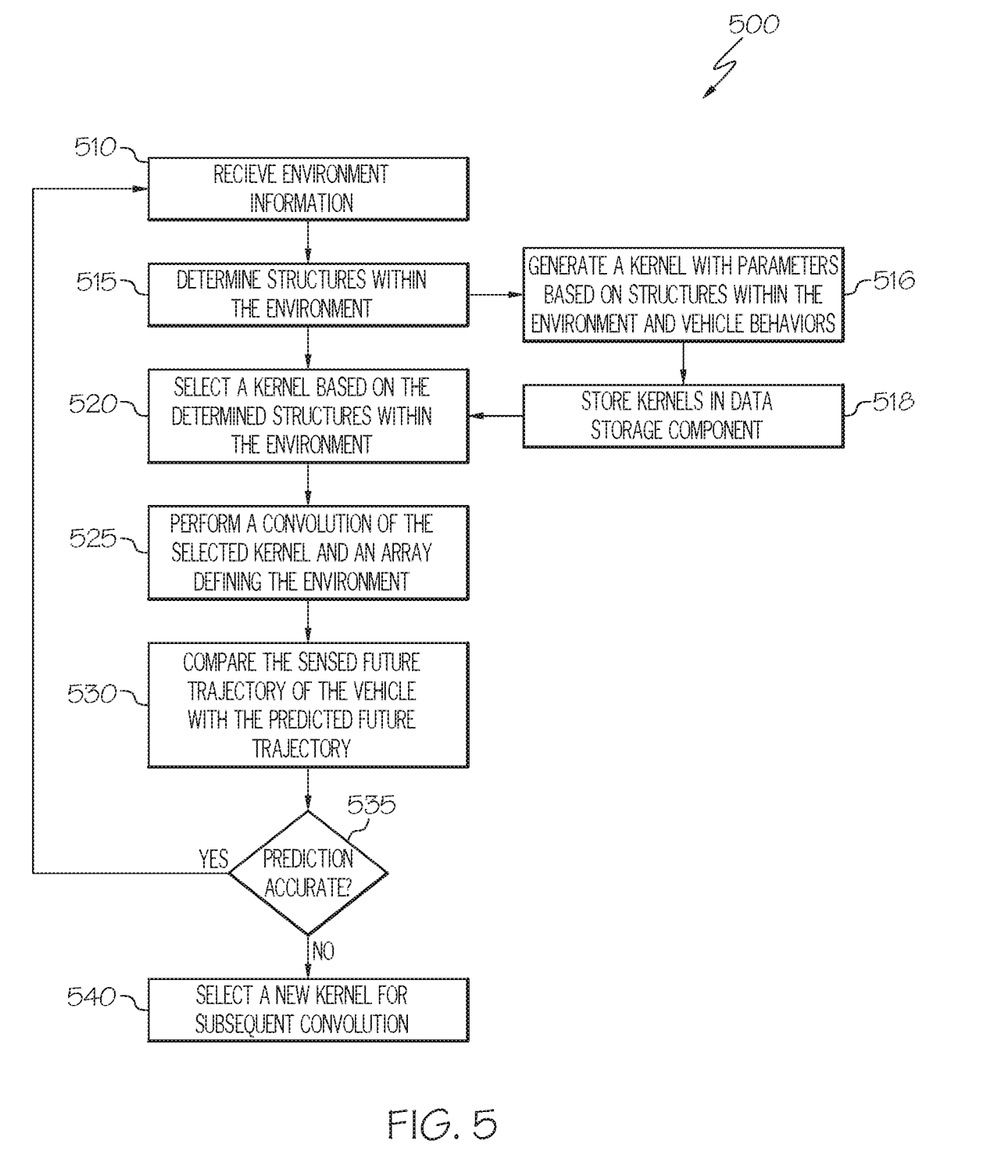
FIG. 5 depicts a flowchart for an example method of generating kernels and performing a convolution to predict future events, according to one or more embodiments shown and described herein.

FIG. 5 depicts a flowchart for an example method of generating kernels and performing a convolution to predict future events, according to one or more embodiments shown and described herein. As described above, the method may be carried out by a computing device 103 or a computing device 103 implemented as a component of a vehicle 210. The flow diagram 500 depicted in FIG. 5 is a representation of a machine-readable instruction set stored in the non-transitory computer readable memory 240 (FIG. 2 or 3) and executed by the processor 230 (FIG. 2 or 3) of the computing device 103. The process of the flow diagram 500 in FIG. 5 may be executed at various times and repeated with various types of environments.

At block 510, the computing device 103, may receive information about the environment. The information may be sensor data captured by one or more sensors configured to capture and transmit signals to the computing device 103. In some embodiments, environment information may be stored in a data storage component 236 of the computing device 103 and accessed when the computing device 103 intends on processing the information. At block 515, the computing device 103 processes the environment information received from the one or more sensors to determine structures within the environment. The structures may be features, objects, a width of a road, a number of lanes of the road, a weather condition, a time of day, a speed limit, a traffic density, an urban or rural environment, or the like. The structures define the environment, the situations, and/or the location or perspective of the environment, for example, from an ego-vehicle 210.

In some embodiments, the computing device 103, at block 516, maybe configured in a learning mode and implement parameterization logic 244b, such that the computing device 103 generates a kernel with parameters based on the structures within the environment and vehicle behaviors that are known to possibly occur within the specific environment. The vehicle behaviors add constraints to the kernel such that improbable or impossible vehicle trajectories will not be contemplated during the prediction step of the convolution. For example, vehicle behaviors may include expected vehicle trajectories within the environment, a vehicle speed, a rule of a road that applies to the environment, or the like. At block 518, one the computing device 103 generates one or more kernels the kernels may be stored in the data storage component 236 of the computing device for later use and/or validation.

At block 520, the computing device 103 may select a kernel that is parameterized for predicting a vehicle trajectory based on the one or more structures determined within the environment. That is, the computing device generates or selects a kernel that corresponds to the particular environment and/or situation within the environment that will best predict the occupancy (or trajectory) of a vehicle or object in the environment atone or more future times. The prediction occurs by performing a convolution of the selected kernel and an array defining the environment at block 525. The convolution predicts a future trajectory and/or occupancy map having a probability distribution defined across a series of discretized cells defining discrete portions of the environment. The probability distribution may be provided to other systems, such as an advanced driver system for determining an autonomous and/or semi-autonomous action.

At block 530, the computing device 103 may compare the sensed future vehicle trajectory that is informed by the one or more sensors with the predicted vehicle trajectory. The computing device 103 completes a comparison to determine whether the predicted vehicle trajectory was accurately predicted or whether the parameters of the selected kernel need to be updated to better predict trajectories in future iterations of the method.

At block 535, if the computing device 103 determines that the prediction is accurate, "YES" at block 535, then the computing device 103 may return to block 510 and repeat the method for the next future time interval. However, if the computing device 103 determines that the prediction is not accurate, "NO" at block 535, then the computing device 103 may advance to block 540 where a new kernel is selected and/or the parameters of the kernel are adjusted to better predict a future vehicle trajectory during future iterations of the method. The computing device 103 may then restart the method by receiving a new set of information about the environment.

The functional blocks and/or flowchart elements described herein may be translated onto machine-readable instructions or as a computer program product, which when executed by a computing device, causes the computing device to carry out the functions of the blocks. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

It should be understood that the embodiments described herein are directed to vehicles, systems, and methods configured to predict future events such as future vehicle trajectories based on a kernel defined with parameters specific to the environment and/or situation in which a prediction is to be made. For example, a vehicle system includes one or more sensors configured to capture aspects of an environment and a computing device. The computing device is configured to: receive information about the environment captured by the one or more sensors, determine one or more structures within the environment based on the received information, select a kernel that is parameterized for predicting a vehicle trajectory based on the one or more structures determined within the environment, and perform a convolution of the selected kernel and an array defining the environment, where the convolution predicts a future trajectory of a vehicle within the environment.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle system comprising:
one or more sensors configured to capture aspects of an environment; and
a computing device configured to:
receive information about the environment captured by the one or more sensors,
determine one or more structures within the environment based on the received information,
select a kernel from a plurality of kernels that correspond to various environments, the selected kernel is parameterized for predicting a vehicle trajectory based on the one or more structures determined within the environment,
perform a convolution of the selected kernel and an array defining the environment, wherein the convolution predicts a future trajectory of a vehicle within the environment, wherein the future trajectory of the vehicle defines one or more predicted future locations of the vehicle in the environment,
obtain a sensed vehicle trajectory of the vehicle,
compare the sensed vehicle trajectory of the vehicle with the predicted future trajectory of the vehicle, and
select, in response to the comparison indicating an inaccurate predicted future trajectory of the vehicle, a second kernel that is parameterized for predicting a vehicle trajectory, wherein the second kernel is based on the one or more structures determined within the environment and the comparison of the sensed vehicle trajectory of the vehicle with the predicted future trajectory of the vehicle.

2. The vehicle system of claim 1, wherein the computing device is further configured to generate one or more kernels comprising parameters that are learned based on the one or more structures of the environment and vehicle behaviors corresponding to the environment.

3. The vehicle system of claim 2, wherein the vehicle behaviors comprise at least one of expected vehicle trajectories within the environment, a vehicle speed, or a rule of a road that applies to the environment.

4. The vehicle system of claim 1, wherein the computing device is further configured to define a plurality of discretized locations within the environment and generate an occupancy map based on the predicted future trajectory of the vehicle, wherein the occupancy map is defined by the plurality of discretized locations within the environment defining a probability distribution of a likelihood that the vehicle will be located at the plurality of discretized locations within the environment.

5. The vehicle system of claim 4, wherein the computing device is further configured to provide the probability distribution to an advanced driver assistance system for determining an action to take in response to the probability distribution.

6. The vehicle system of claim 1, wherein the one or more structures comprises identification of at least one of a width of a road, a number of lanes of the road, a weather condition, a time of day, a speed limit, a traffic density, or an urban or rural environment.

7. The vehicle system of claim 1, wherein the one or more structures comprises the vehicle.

8. The vehicle system of claim 1, wherein the kernel is based on a heat equation.

9. A computing device configured to:
receive information about an environment;
determine one or more structures within the environment based on the received information;
select a kernel from a plurality of kernels that correspond to various environments, the selected kernel is parameterized for predicting a vehicle trajectory based on the one or more structures determined within the environment;
perform a convolution of the selected kernel and an array defining the environment, wherein the convolution predicts a future trajectory of a vehicle within the environment, wherein the future trajectory of the vehicle defines one or more predicted future locations of the vehicle in the environment;
obtain a sensed vehicle trajectory of the vehicle;
compare the sensed vehicle trajectory of the vehicle with the predicted future trajectory of the vehicle; and
select, in response to the comparison indicating an inaccurate predicted future trajectory of the vehicle, a second kernel that is parameterized for predicting a vehicle trajectory, wherein the second kernel is based on the one or more structures determined within the environment and the comparison of the sensed vehicle trajectory of the vehicle with the predicted future trajectory of the vehicle.

10. The computing device of claim 9, wherein the computing device is further configured to generate one or more kernels comprising parameters that are learned based on the one or more structures of the environment and vehicle behaviors corresponding to the environment.

11. The computing device of claim 10, wherein the vehicle behaviors comprise at least one of expected vehicle trajectories within the environment, a vehicle speed, or a rule of a road that applies to the environment.

12. The computing device of claim 9, wherein the computing device is further configured to define a plurality of discretized locations within the environment and generate an occupancy map based on the predicted future trajectory of the vehicle, wherein the occupancy map is defined by the plurality of discretized locations within the environment defining a probability distribution of a likelihood that the vehicle will be located at the plurality of discretized locations within the environment.

13. The computing device of claim 12, wherein the computing device is further configured to provide the probability distribution to an advanced driver assistance system for determining an action to take in response to the probability distribution.

14. The computing device of claim 9, wherein the one or more structures comprises identification of at least one of a width of a road, a number of lanes of the road, a weather condition, a time of day, a speed limit, a traffic density, or an urban or rural environment.

15. A method for predicting future events, the method comprising:
receiving information about an environment;
determining one or more structures within the environment based on the received information;
selecting a kernel from a plurality of kernels that correspond to various environments, the selected kernel is parameterized for predicting a vehicle trajectory based on the one or more structures determined within the environment;
performing a convolution of the selected kernel and an array defining the environment, wherein the convolution predicts a future trajectory of a vehicle within the environment, wherein the future trajectory of the vehicle defines one or more predicted future locations of the vehicle in the environment;

obtaining a sensed vehicle trajectory of the vehicle;

comparing the sensed vehicle trajectory of the vehicle with the predicted future trajectory of the vehicle; and selecting, in response to the comparison indicating an inaccurate predicted future trajectory of the vehicle, a second kernel that is parameterized for predicting a vehicle trajectory, wherein the second kernel is based on the one or more structures determined within the environment and the comparison of the sensed vehicle trajectory of the vehicle with the predicted future trajectory of the vehicle.

16. The method of claim 15, further comprising:

defining a plurality of discretized locations within the environment; and generating an occupancy map based on the predicted future trajectory of the vehicle, wherein the occupancy map is defined by the plurality of discretized locations within the environment defining a probability distribution of a likelihood that the vehicle will be located at the plurality of discretized locations within the environment.

17. The method of claim 16, further comprising:

providing the probability distribution to an advanced driver assistance system for determining an action to take in response to the probability distribution.

* * * * *